Feb. 18, 1958 T. H. JOHNSON 2,824,284
MICROWAVE-REGISTERING OF PROJECTILE
POSITION AND VELOCITY IN GUNS
Filed Oct. 3, 1947 2 Sheets-Sheet 2

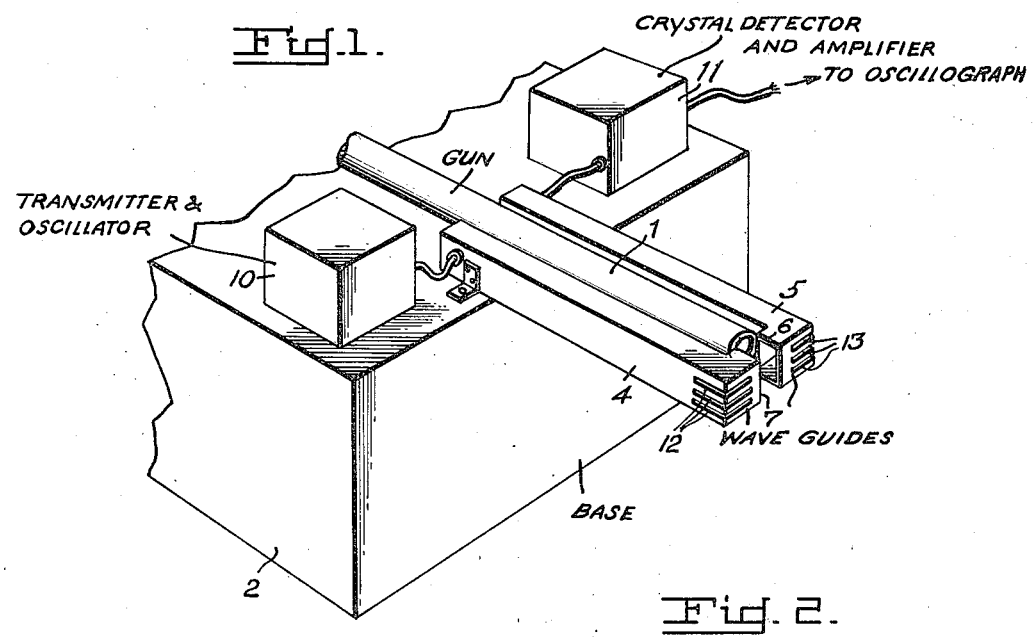
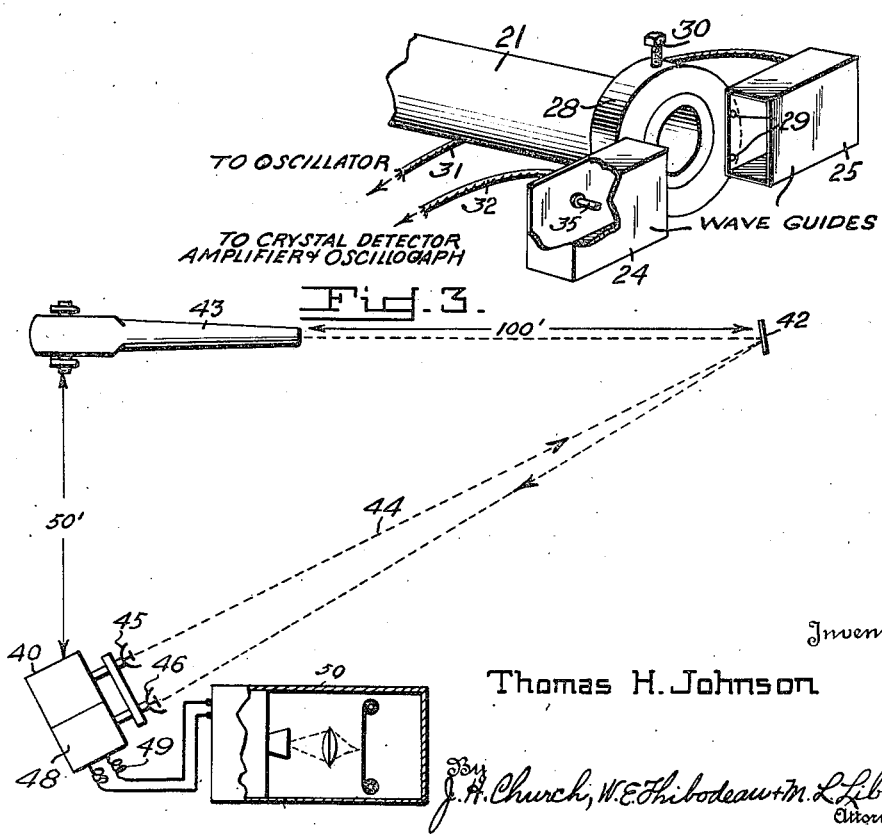

BEGINNING
OF MOTION
⟵1 MILLI-SECOND⟶
MUZZLE

Inventor
Thomas H. Johnson
By J. H. Church, W. E. Thibodeau & M. L. Libman
Attorneys

United States Patent Office 2,824,284
Patented Feb. 18, 1958

2,824,284

MICROWAVE-REGISTERING OF PROJECTILE POSITION AND VELOCITY IN GUNS

Thomas H. Johnson, Brookhaven, N. Y.

Application October 3, 1947, Serial No. 777,841

6 Claims. (Cl. 324—70)

(Granted under Title 35, U. S. Code (1952), sec. 266)

The invention described herein may be manufactured and used by or for the Government of the United States of America for governmental purposes without the payment of any royalties thereon or therefor.

My invention relates to a method and apparatus for measuring the instantaneous displacement and velocity of a projectile by means of ultra-high-frequency radio waves, and has for a particular object the provision of test equipment and technique whereby the distance travelled by a projectile inside a gun may be determined as a function of time.

Another object of my invention is to enable projectile motion in a gun bore to be measured with great accuracy by readily available means and without exerting such influence on the projectile by the test means as to affect projectile motion. An additional object is to provide test means which may be used with any gun without altering the gun or its performance in any way, and which is relatively simple, inexpensive, and highly reliable in operation.

In the study of burning gases it is often desirable to know the volume occupied by the propellant gases as one of the important thermodynamic variables, or to know the work done by the gases at each stage of the burning. One of the other variables, the pressure, is regularly measured by a piezo-electric pressure gage inserted into the powder chamber. The temperature has also been measured by the color or the intensity of the radiation. But in order to gain a complete understanding of the burning process it is also desirable to know the volume occupied by the gas. In previous studies of this process the volume has usually been estimated by calculating the motion of the projectile from the forces acting upon it. But this method is subject to the uncertainty attending the estimates of the bore friction and the force required to engrave the rotating band. A continuous measurement of the actual motion of the projectile has not previously been possible although in small calibre guns a limited number of studies of position have been made by the method of flash X-rays.

Referring to the drawings:

Figure 1 is a schematic perspective view of one modification of my invention,

Figure 2 shows the invention of Figure 1, but with a different specific form of wave guide, Figure 3 shows a modification of my invention using a radar-type transmitting and reflection-receiving equipment.

Figure 4:
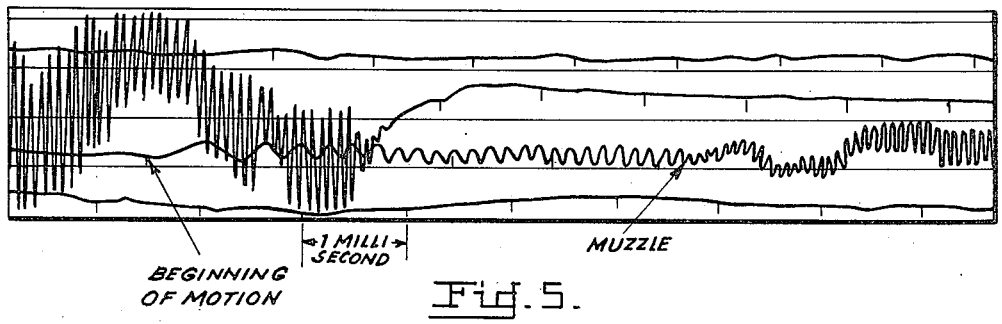
Figures 4 and 5 show typical records taken in accordance with my invention.

Referring to Figure 1, a gun 1, is clamped by conventional means (not shown) to a standard recoilless mount or base 2. In practice, the equipment shown in Figure 1 was used with a 20 mm. gun. Also clamped to base 2, on either side of gun 1, are two ultra-high-frequency wave guides 4 and 5 so arranged that their open ends 6, 7, and the gun muzzle 8 are adjacent to each other, as shown, to form an electrically coupled system comprising a transmitter 4, receiver 5, and cylindrical hollow resonator formed by the interior of the gun barrel 1 and of an effective length determined by the position of the forward end of the projectile which is in the gun barrel. As the projectile moves toward the muzzle, the effective electrical length of the resonator diminishes. If the length of the cavity thus formed is such that it resonates to the frequency of the transmitted radiation, a strong signal will be reflected back from the cavity to the receiver 5, but if resonance does not occur in the cavity, the signal will be relatively weak. Since the resonance condition may depend very critically upon the length of the cavity, the received signal may be made to fluctuate in intensity depending on the instantaneous position of the projectile in the bore.

The unit of distance used in this type of measurement is the wave length of the radiation in the bore of the gun. It is possible to measure the frequency of the radiation with a precision approximating 1 part in 100,000 and since the velocity of light in free space is known with comparable accuracy the free space wave length may be determined with high accuracy. However, the wave length of radiation of a given frequency in a cylindrical wave guide, such as the bore of a gun, is not the same as that of the same radiation in free space. In fact, there may be several different wave lengths of radiation of a given frequency in the wave guide corresponding to the various modes of propagation. Each mode is characterized by a certain critical wave length, $\lambda$ (M,N,) which is the longest free space wave length which will enter the wave guide in the (MN) mode. These critical wave lengths in a gun of diameter $d$ for a few of the first modes are as follows:

For transverse electric fields (TE)—
$\lambda 01 = .820d$
$\lambda 11 = 1.707d$
$\lambda 02 = .448d$
$\lambda 12 = .589d$ For transverse magnetic fields (TM)—
$\lambda 01 = 1.306d$
$\lambda 11 = .820d$
$\lambda 21 = .612d$
$\lambda 02 = .569d$
$\lambda 12 = .448d$ when the wave length in free space is $\lambda$ then the wave length in the bore of the gun, $\lambda G$, for the (MN) mode of propagation is given by the equation $$\lambda G = \lambda / (1 - (\lambda/\lambda M,N)^2)^{1/2}$$

For a more complete discussion of this subject, see "Fields and Waves in Modern Radio"; Ramo and Whinnery, John Wiley and Sons, 1944, pages 335–341.

The above results which are derived from electromagnetic theory hold for cylindrical tubes with smooth walls. In the case of a rifled gun barrel there may be some modification which will have to be determined experimentally arising from the effect of the lands, but the same type of relationship holds, and in practice has been found effective in measuring projectile velocity.

In practice, transmitting wave guide 4 is energized at a suitable wave length in the centimeter region by transmitter and oscillator 10, and receiver wave guide 5 is connected to a detector and amplifier 11 whose output is fed to a suitable recording oscillograph for providing a record of the change in amplitude of the received signal with time as the projectile traverses the bore. Receiver, transmitter and oscillograph are all of conventional construction, and the manner of their use is well-known to those skilled in the art of electronic equipment (for an example, see "Instruments," January 1947, page 16). The wave guides 4 and 5 are of heavy construction, and are provided with slots 12, 13 in the section near the muzzle to allow the muzzle gases to escape.

Figure 2 shows another type of wave guide suitable for use with a large gun, such as a 75 mm. gun 21. Two short sections of wave guide, 24, 25, are used for receiver and transmitter, respectively. These are of light construction, and are intended to be renewed for each round. Guides 24, 25, are attached by screws 29, to a heavy muzzle band 28, which may be securely clamped to the gun by a set screw 30. The oscillator, which may be a klystron (not shown), is conventionally connected to the transmitter wave guide (of either modification) by a coaxial cable 31, and a second such cable 32, may be used to connect the receiver wave guide to a suitable detector, such as a crystal detector and amplifier. Coupling between coaxial cables and wave guides may be by means of short antenna stubs, as shown at 35 set at ¼ wave length from the closed end of the guide, in accordance with known practice.

Instead of wave guides, a microwave beam may be reflected into the barrel of the gun as in Figure 3, in such manner as to set up a mode of beat wave propagation suitable for use in measuring the reflected radiation from the gun barrel as a resonator. In this case, the Doppler effect interaction between the reflected wave and the transmitted wave may be noted on a suitable recording device, such as a moving film. The operation is actually the same in principle as that previously described, except that the necessity for close physical coupling between the transmitting and receiving antenna and the gun barrel is eliminated. Such an arrangement is shown in Figure 3, in which a microwave transmitter of generally known construction 40, is used to direct a tight beam 44, from transmitting paraboloid, against a reflecting surface or mirror 42, placed in front of the gun 41. The mirror may be offset slightly from the line of fire or it can be directly in the line of fire, as it may be expendable. With this method of operation and with gun barrels in which several modes are possible, the plane polarized radiation from the transmitter tends to enter the gun with the TE (1,1) mode (see "Basic Radio," Hoag, 1942, Van Nostrand Co., New York), and this mode can be preserved after reflection if a flat nosed projectile is used.

The reflected wave from the projectile nose, serving as the bottom of the hollow resonator formed by the gun barrel, is received by receiving paraboloid 46, and is compared by known measuring techniques, with a small portion of the direct transmitter output. The resultant beat frequency is a measure of the Doppler frequency shift, which is produced when a continuous wave carrier strikes a moving object and is reflected therefrom. If the detected object moves toward the carrier source (in this case the reflector 42), a positive frequency shift results, adding to the carrier frequency.

A simplified explanation of this effect is as follows:

An observer with a half-wave rectifier, or other suitable means, moving with the projectile in the gun barrel would observe in a given unit of time as many maxima as were transmitted in that time interval, plus the number of wave lengths through which he had moved in the same period of time. The frequency ($F'$) he would observe would be $$F' = F + \frac{V}{\lambda}$$

where $\lambda$ is the wavelength of the transmitted energy, $V$ the instantaneous velocity of the projectile, and $F$ the transmitted frequency.

Part of the energy incident upon the projectile will be reflected back in the direction of the source. As far as a second observer at the source (in this case, receiving paraboloid 46) would be concerned, the projectile may as well be a second source of radiation toward which he is moving; he would therefore measure a frequency $F''$ which would be $F'$ plus the number of wave lengths through which the target has moved (or through which he and the target have moved toward each other) in unit time, or $$F'' = F' + \frac{V}{\lambda}$$

and substituting the value of $F'$ from the previous equation, $$F' = F + \frac{2V}{\lambda}$$

and since $$\lambda = \frac{C}{F}$$

where $C$ is the velocity of light, $$F'' = F + \frac{2VF}{C}$$

The quantity $$\frac{2VF}{C}$$

is called the "Doppler frequency," and is obviously proportional to the velocity of the projectile when the transmitted frequency is constant, as in this case.

The beat frequency (or difference frequency) of the transmitted and received waves is therefore a function of the instaneous velocity of the projectile. This frequency is suitably amplified in detector and amplifier 48, and is conducted through line 49 to a suitable high speed oscillograph 50, of any conventional construction, where a record is made of the variation of the beat frequency signal against time.

Figure 5:
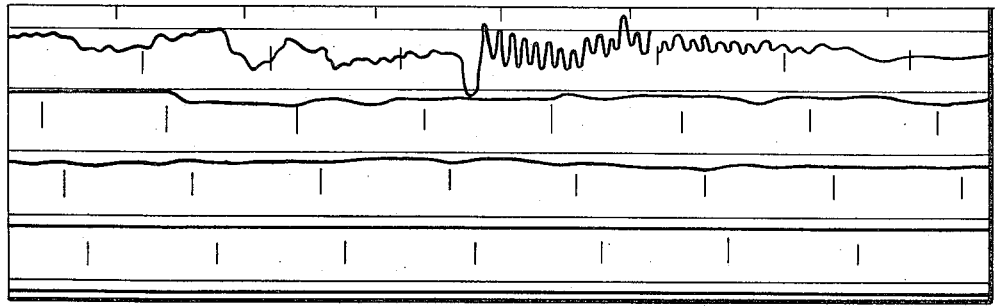
Figure 6:
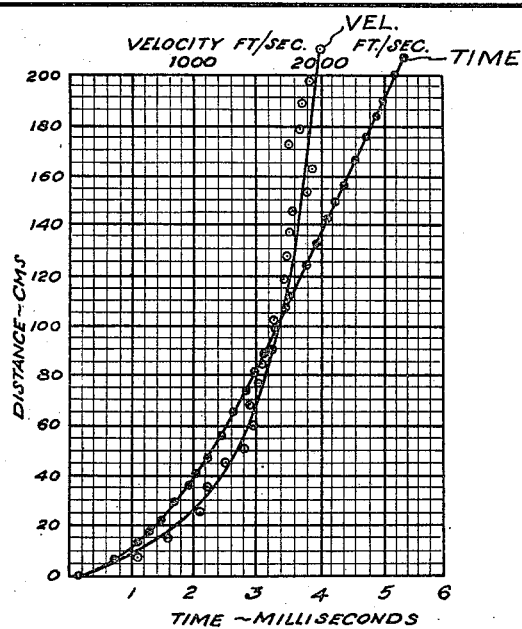
Figure 6 is a graph of the forward motion of a projectile in a gun barrel.

A typical record, taken with the above type of arrangement at approximately 10 cm., is shown in Figure 4. This record shows signal intensity as a function of time and each oscillation of the record corresponds to the forward motion of the projectile by ½ the wave length of the TE (1,1) mode. Figure 5 shows a record obtained with 3 centimeter radiation using the wave guide method of coupling to a 20 mm. gun. Figure 6 illustrates the present accuracy of measurements of this type. The velocities determined from the time of travel through ½ wave length intervals is shown in the same figure.

I claim:

1. An apparatus for measuring the velocity of a projectile in a gun barrel comprising a microwave generator, a waveguide disposed in contiguous relation to said gun barrel and connected to said generator to conduct microwave energy, a second waveguide disposed in contiguous relation to said barrel to receive and transmit said energy, said gun barrel forming a cylindrical hollow resonator the electrical length of which is determined by the position of said projectile, and means connected to said second waveguide to detect said energy.

2. An apparatus for measuring the velocity of a projectile in a gun barrel comprising a microwave generator, a waveguide connected to said generator and disposed in contiguous relation to said gun barrel and terminating adjacent the muzzle thereof, a second waveguide disposed in contiguous relation to said gun barrel and terminating at one end thereof adjacent the barrel muzzle, said gun barrel forming a cylindrical resonator the electrical length of which is determined by the position of said projectile, and means connected to the other end of said second waveguide to receive and detect microwave energy whereby variations in the electrical length of said resonator due to passage of said projectile along the bore serves to intermittently augment the total received energy.

3. An apparatus for measuring the velocity of a projectile in a gun barrel comprising a microwave generator, a waveguide connected to said geenrator and disposed adjacent said gun barrel to terminate at the muzzle thereof, a second waveguide disposed adjacent said gun barrel to terminate at one end thereof at the muzzle at a point circumferentially spaced from said first waveguide, said barrel forming a microwave resonator between said waveguides, and means connected to the other end of said second waveguide to receive and detect microwave energy.

4. An apparatus for measuring the velocity of a projectile in a gun barrel comprising a gun barrel, a microwave generator exterior of said gun barrel, means for transmitting microwave energy from said generator to said gun barrel, means for receiving said microwave energy from said gun barrel, said gun barrel forming a cylindrical hollow resonator the electrical length of which is determined by the position of said projectile in said gun barrel, and means connected to said last named means to detect said microwave energy.

5. An apparatus for measuring the velocity of a projectile in a gun barrel comprising a gun barrel, a microwave generator exterior of said gun barrel, means for transmitting microwave energy from said geneartor to the muzzle end of said gun barrel, means for receiving said microwave energy from said gun barrel, said gun barrel forming a cylindrical hollow resonator the electrical length of which is determined by the position of said projectile in said gun barrel, and means connected to said last named means to detect said microwave energy.

6. An apparatus as set forth in claim 5 wherein said means for transmitting microwave energy comprises a microwave reflector and a directional antenna electrically connected to said generator, said reflector having a reflecting surface positioned in substantial alignment with the axis of said gun barrel at the muzzle end thereof and obliquely disposed thereto, and said antenna directed toward said reflecting surface to transmit said microwave energy to said reflecting surface so that said microwave energy will be reflected down said gun barrel.

References Cited in the file of this patent

UNITED STATES PATENTS

| | | |
|---|---|---|
| 2,193,361 | Rice | Mar. 12, 1940 |
| 2,268,587 | Guanella | Jan. 6, 1942 |
| 2,382,981 | Edgerton | Aug. 21, 1945 |
| 2,391,554 | De Forest | Dec. 25, 1945 |
| 2,400,189 | Carlson et al. | May 14, 1946 |
| 2,434,349 | Cohen | Jan. 13, 1948 |
| 2,514,297 | Smith et al. | July 4, 1950 |
| 2,517,133 | Porter | Aug. 1, 1950 |
| 2,557,949 | Deloraine | June 26, 1951 |
| 2,691,761 | Smith | Oct. 12, 1954 |

OTHER REFERENCES

Pages 10–69 to 10–74 in "Principles of Radar," by M. I. T. Radar School Staff, released to public March 15, 1946.